UNITED STATES PATENT OFFICE.

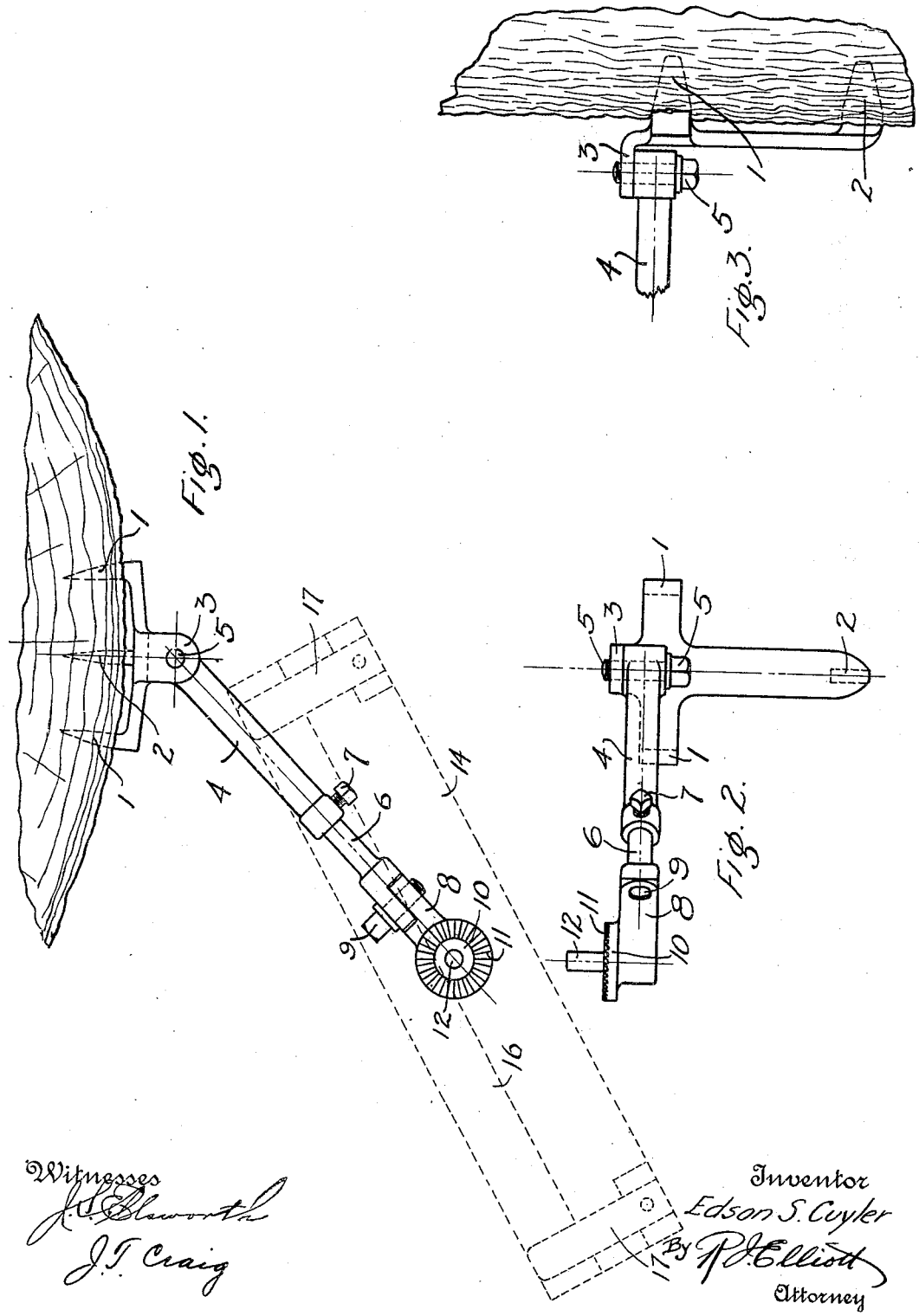

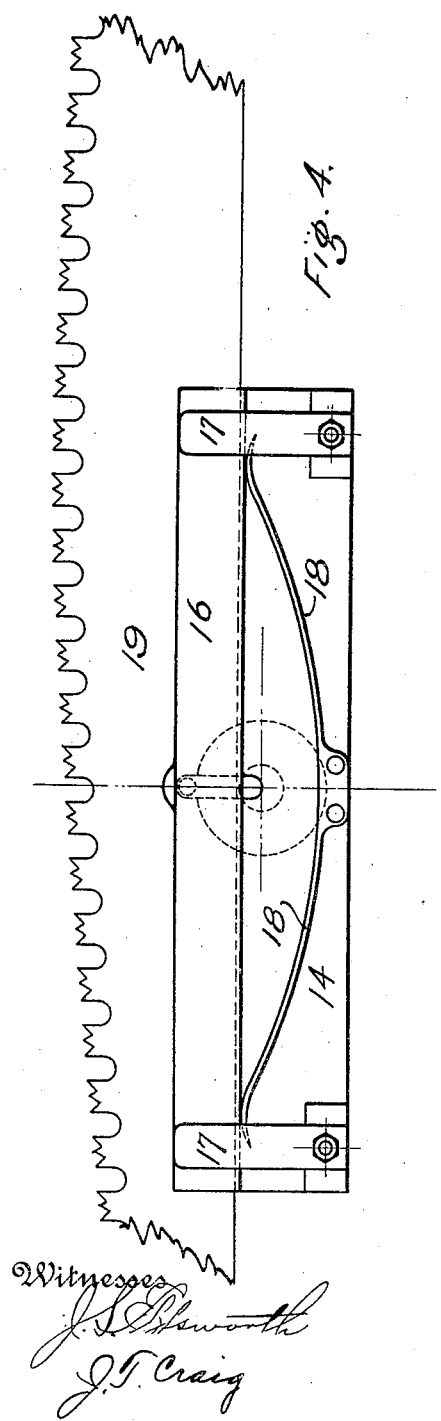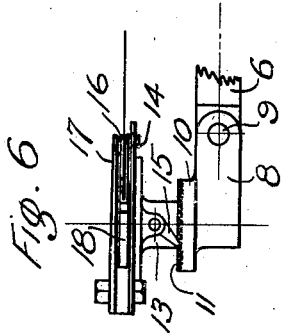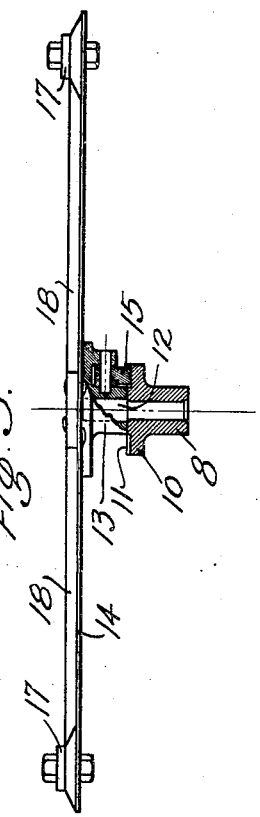

EDSON S. CUYLER, OF NEAR TACOMA, WASHINGTON.

TIMBER-FELLING MACHINE.

938,559.

Specification of Letters Patent.   Patented Nov. 2, 1909.

Application filed May 6, 1908.   Serial No. 431,219.

*To all whom it may concern:*

Be it known that I, EDSON S. CUYLER, a citizen of the United States of America, residing near Tacoma, in the county of Pierce and State of Washington, have invented certain new and useful Improvements in Timber-Felling Machines, of which the following is a specification, reference being had therein to the accompanying drawing.

This invention relates to felling machines and has for its object to provide a readily removable and adjustable device adapted to be applied to a large tree such as is common in the western forests, whereby one end of the saw is engaged and guided so that the tree may be felled by one man instead as at present by two men. I attain this object by the mechanism illustrated in the accompanying drawings, in which—

Figure 1 is a plan view showing my device applied to a tree, and showing the saw guide thereon in dotted lines; Fig. 2 is a front projection of said Fig. 1; and Fig. 3 is a side projection of a portion of said Fig. 2; Fig. 4 is a plan showing the saw guide with a saw therein; Fig. 5 is a front elevation thereof showing a view of the lower portion in section; and Fig. 6 is a side elevation thereof.

Similar numerals of reference refer to similar parts throughout the several views.

This invention consists of a supporting body provided with two upper dogs 1 and a lower dog 2 located centrally thereunder and adapted to be driven into the trunk of a tree below the line of the cut. The said body has an outwardly bent extension 3 at its upper end, said extension 3 being adapted to support an arm 4 by means of a bolt 5. Said arm 4 swings around the bolt 5, which acts as its pivot, and can be held in any position by simply tightening the bolt 5. The arm 4 is hollow and holds an extension bar 6, said bar 6 being adjustable as to the distance which it projects from the arm 4, and as to its angular position therein, and being held in said adjusted position by means of a set screw 7 passing through the arm 4. The end of the extension bar 6 is provided with a head, to which is pivotally secured the body 8 by means of the horizontal bolt 9 passing through said head and through a portion of the body, whereby said body is held in any position about said pivot-bolt 9. The body 8 carries a table 10, the upper surface of which is serrated with radial teeth 11, and also has an upward extending pivot pin 12 centrally secured therein. The base 13 of the saw table 14 has a central hole therein in which said pivot pin 12 fits, so that said table 14 turns freely about said pivot pin. The base 13 also carries a dog 15 adapted to engage the teeth 11 of the table 10 so that when said dog engages the teeth, the table 14 can only be turned in one direction, and since the base 13 is loose on the pin 12, I can quickly change the dog from one position to the other by simply lifting the base 13 and swinging the dog on its pivot to opposite position. The table 14 carries a sliding saw-guide 16 thereon, said guide being held down by means of straps 17 secured to the table 14 and being pressed outward by means of the double spring 18 also secured to the table 14 and engaging the rear edge of the saw guide 16.

My device is used by driving the dogs 1 and 2 into the tree and then adjusting the position of the arm 4 by means of the bolt 5 and the position of the extension 6 by means of the set screw 7, and the angle of the table 14 by means of the pivot-bolt 9 and then placing the dog 15 in the proper position thereon to control the movements of the table 14. The back edge of the saw 19 is then inserted in the saw guide 16 and the saw is reciprocated therein to cut the tree. As the cut is deepened the table 14 swings on the pivot 12, the dog 15 thereof engaging successive teeth 11 and the spring 18 keeping a perfectly uniform pressure on the saw.

Having described my invention what I claim is:

1. A guide or support for the free end of a saw adapted to be secured to the tree to be sawed and comprising a table; means for supporting the table from the tree trunk being sawed; means for adjusting the position of the table about two horizontal axes at right angles to each other; ratchet means for controlling the position of the table about a vertical axis; and a spring carried by said table and adapted to engage the back of said saw to press it forward.

2. A guide or support for the free end of a saw adapted to be secured to the tree to be sawed and comprising a table; a supporting body provided with dogs adapted to be driven into the trunk of the tree being sawed; a radius arm adjustably supported by said body; an extension mounted in said arm and adjustable therein in length as well as in rotative position; a ratchet body adjustably supported by said arm extension and bearing a pivot on which said saw-supporting table is pivotally mounted; a ratchet dog secured to the table and engaging the ratchet to control the portion of the table on the pivot; and a spring carried by said table and adapted to engage the back of said saw to press it forward.

In testimony whereof I affix my signature in presence of two witnesses.

EDSON S. CUYLER.

Witnesses:
M. F. McNEIL,
P. L. HILL.